US012749374B2

(12) United States Patent
Russ et al.

(10) Patent No.: US 12,749,374 B2
(45) Date of Patent: Sep. 29, 2026

(54) REVENUE SHARING FOR USER-GENERATED VIRTUAL WAGERING GAMES AND GAMING ENVIRONMENTS

(71) Applicant: IGT, Las Vegas, NV (US)

(72) Inventors: Michael Russ, Graz (AT); Daniel Landry, Moncton (CA); David Froy, Lakeville-Westmorland (CA); Jackie Alvarez, Las Vegas, NV (US); Todd Grimm, Riverview (CA); David Small, Moncton (CA); Karen Van Niekerk, Dieppe (CA); Anthony Baerlocher, Henderson, NV (US); Aaron Corey, Moncton (CA)

(73) Assignee: IGT, Las Vegas, NV (US)

( * ) Notice: Subject to any disclaimer, the term of this patent is extended or adjusted under 35 U.S.C. 154(b) by 468 days.

(21) Appl. No.: 18/457,120

(22) Filed: Aug. 28, 2023

(65) Prior Publication Data

US 2025/0078615 A1 Mar. 6, 2025

(51) Int. Cl.
*G07F 17/32* (2006.01)

(52) U.S. Cl.
CPC ...... *G07F 17/3244* (2013.01); *G07F 17/3227* (2013.01); *G07F 17/3267* (2013.01); *G07F 17/3239* (2013.01)

(58) Field of Classification Search
CPC ............. G07F 17/3244; G07F 17/3227; G07F 17/3267; G07F 17/3239; G07F 17/3211
USPC ............................................................ 463/25
See application file for complete search history.

(56) References Cited

U.S. PATENT DOCUMENTS

2020/0193776 A1* 6/2020 Oberberger ......... G07F 17/3276

FOREIGN PATENT DOCUMENTS

CA 3179017 A1 4/2023

OTHER PUBLICATIONS

Sweeney, "How Epic Games Views he Metaverse and the State of Unreal," Dean Takahashi, @deantak, Mar. 29, 2023, <URL: https://venturebeat.com/games/how-epic-games-views-the-metaverse-and-the-state-of-unreal-tim-sweeny/> 29 pages.

Poindexter, O., "How Roblox Got a Head Start on Potential $800B Metaverse," Innovation, Dec. 6, 2021, <URL: https://frontofficesports.com/how-roblox-got-a-head-start-on-potential-800b-metaverse/> 4 pages.

* cited by examiner

*Primary Examiner* — Pierre E Elisca
(74) *Attorney, Agent, or Firm* — Spencer Fane LLP; William M. Kelly

(57) ABSTRACT

A graphical user interface (GUI) including a plurality of wagering game assets, such as game modules, math models, cosmetic game features, and other assets is provided to a user. Based on first user input received from the user via a GUI, a first virtual wagering game is generated using selected assets. The input may include selection from a plurality of The first virtual wagering game is provided to a plurality of players in a virtual gaming environment. A first revenue amount is received from wagers by the players in the first virtual wagering game. A first portion of the first revenue amount is awarded to the user.

20 Claims, 11 Drawing Sheets

REVENUE SHARING FOR USER-GENERATED VIRTUAL WAGERING GAMES AND GAMING ENVIRONMENTS

BACKGROUND

Embodiments described herein relate to game play features with wagering games, and in particular to revenue sharing for user-generated virtual wagering games and gaming environments, and related devices, systems, and methods. As virtual gaming applications, such as metaverse applications, proliferate, there is a need to obtain and distribute a wide variety of content for a wide variety of customers and customer interests, and it may be difficult for professional game designers and virtual environment creators to meet increasing demand.

BRIEF SUMMARY

According to some embodiments, a system includes a processor circuit and a memory coupled to the processor circuit. The memory comprises machine readable instructions that, when executed by the processor circuit, cause the processor circuit to, based on first user input received from the user via the GUI, generate a first virtual wagering game. The instructions further cause the processor circuit to provide the first virtual wagering game to a plurality of players in a virtual gaming environment. The instructions further cause the processor circuit to receive a first revenue amount from wagers by the players in the first virtual wagering game. The instructions further cause the processor circuit to award a first portion of the first revenue amount to the user.

According to some embodiments, a gaming device includes a display device, an input device, a processor circuit and a memory coupled to the processor circuit. The memory comprises machine readable instructions that, when executed by the processor circuit, cause the processor circuit to display a graphical user interface (GUI) via the display device comprising a plurality of wagering game assets to a user. The instructions further cause the processor circuit to, based on first user input received from the user via the input device, generate a first virtual wagering game. The instructions further cause the processor circuit to provide the first virtual wagering game to a plurality of players in a virtual gaming environment. The instructions further cause the processor circuit to receive a first revenue amount from wagers by the players in the first virtual wagering game. The instructions further cause the processor circuit to award a first portion of the first revenue amount to the user.

According to some embodiments a method includes providing, via a display device of a gaming device, a graphical user interface (GUI) comprising a plurality of wagering game assets to a user. The method further includes, based on first user input received from the user via the GUI, generating, by a processor circuit of the gaming device, a first virtual wagering game. The method further includes providing, by the processor circuit, the first virtual wagering game to a plurality of players in a virtual gaming environment. The method further includes receiving, by the processor circuit, a first revenue amount from wagers by the players in the first virtual wagering game. The method further includes awarding, by the processor circuit, a first portion of the first revenue amount to the user.

DETAILED DESCRIPTION

Figure 1:
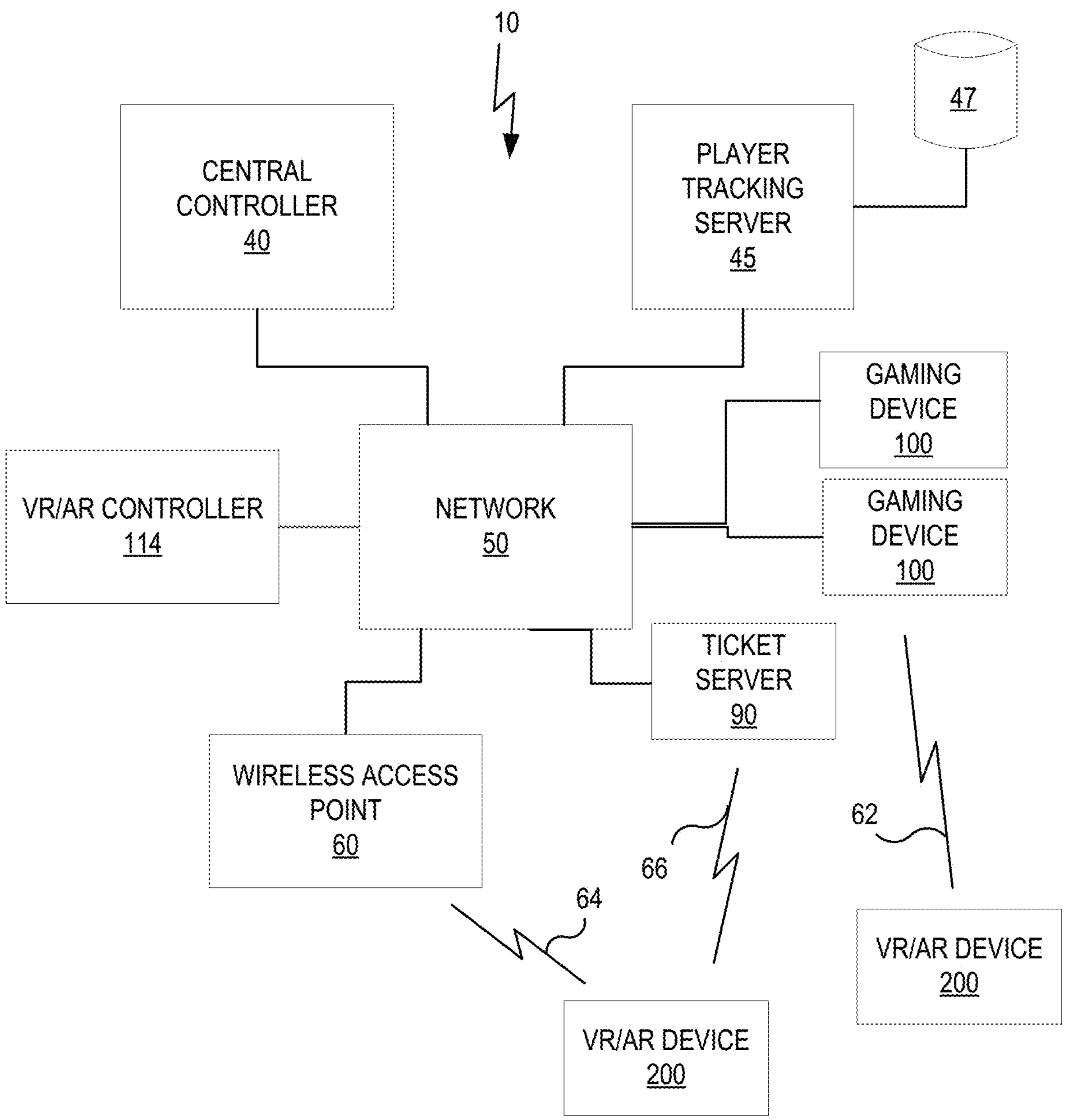
FIG. 1 is a schematic block diagram illustrating a network configuration for a plurality of gaming devices according to some embodiments.

Embodiments described herein relate to game play features with wagering games, and in particular to revenue sharing for user-generated virtual wagering games and gaming environments, and related devices, systems, and methods. Embodiments include multiple mechanisms of revenue creation through user interactions within a metaverse environment, for users, operators, and service providers within the metaverse ecosystem. In some embodiments, user-generated content or games, user-owned or operated virtual venues (e.g., virtual casinos), investment vehicles, and/or virtual environment customization may be sources of revenue within the metaverse environment.

In some embodiments, a virtual marketplace may be provided for selling or leasing virtual properties, such as virtual real estate, to create and design a virtual venue, such as a virtual casino or gaming environment. Other properties may include a pre-configured virtual casino, virtual gaming machines, virtual games, and/or game licenses that may provide an accounting system in the background for users, operators, manufacturers, and/or investors to perform transactions, and to manage user accounts, ownership validation, payments, asset prices, virtual goods, or other transactions. For example, virtual casino ownership may include management of user accounts, owner validation, revenue creation and allocation, and revenue sharing based on distribution of ownership. For a virtual gambling (e.g., casino play) application, the system may manage and track user transactions in the venue. The system may provide a toolkit for generating and/or searching for virtual games, including assets, e.g., math, music, backgrounds, for a user to create and/or customize a virtual game. The toolkit and/or components thereof may be provided for free and/or in exchange for a fee or subscription payment. The system may also include a virtual marketplace to view existing created games (e.g., by other users or by the manufacturer), and may include social media style components for voting, ranking, commenting, rating, etc. for game listed within the marketplace. The system may include advanced search and location features for large libraries of games, such as filtering, to more easily search and navigate the marketplace.

In some embodiments a virtual casino venue may be a virtual location where users can play casino-like games, interact with other players, and/or engage in social activities such as attending virtual concerts or events. Players may be able to create avatars to represent themselves in the virtual world, can earn virtual currency that can be used to purchase virtual goods, traded, or even exchanged for real money. The virtual casino and other metaverse experiences can be provided through a variety of devices and technologies, such as virtual reality (VR), augmented reality (AR), personal computing devices, mobile computing devices, home entertainment technologies such as smart televisions and/or set-top boxes, etc.

In some embodiments, users may create and/or customize games and make those games available in a virtual casino or other virtual gaming venue in the metaverse environment. Creators of successful games may earn a share in revenue based on usage (e.g., number of spins or games played), popularity (e.g., positive reviews), and/or total revenue earned by the game, etc. In some examples, a creator may purchase access to game components in a game creation marketplace. In some embodiments, individual components such as math models, artwork, etc., can be provided by an operator and/or by other users, with mechanisms for purchasing and/or accessing different components, such as paying for each component individually with an associated cost, or paying a flat rate per game, with volume discounts for example. In some examples, a user may pay to access a creation tool with a predetermined library of different components and assets. In some examples, the creation tools and/or assets may be provided for free, with a game identifier for each game being associated with a creator and being sharable within the metaverse community for accessing the game.

In some examples, the game may create revenue through play, e.g., by accepting wagers, with the revenue being shared among the provider of the tool, the virtual operator, and/or the game creator, as desired. In some examples, users may sell their stake in a game to other users with a transaction fee going to the game provider and/or to the game provider itself.

In some embodiments, a user-owned virtual venue may be owned or leased by a user, with the user earning a share of the revenue generated by the virtual venue. For example, a user may purchase virtual infrastructure, such as virtual land, construction materials, preconfigured structures, etc. In some examples, the virtual venue may charge an entry fee for different virtual locations and/or experience levels. In some examples, a virtual casino entry token may be sold and redeemed for a number of virtual casino visits and/or for a predetermined amount of time. Different tiers of membership may include different benefits.

In some examples, a virtual casino owner can rent out or sell some or all of the virtual venue to other users, such as areas within the virtual casino, specific virtual EGMs or banks of EGMs, etc. Such access may be time-limited or permanent, e.g., a user may rent a portion of the venue for a limited time and may elect to purchase at the end of that week. In some examples, the entire venue may be rented out for a private event, e.g., a private party. In some examples, a user may rent a temporary license to a game or game theme, such that certain games can be provided in the virtual casino for special events.

In some embodiments, the system may include an app or features for providing guided tours of the virtual venue or other amenities, such as a virtual preview through the app before an actual visit, a preview of the available games, and/or a game finder feature, for example.

In some examples, the virtual venue and/or games may be time-limited and/or dynamic pricing. For example, different virtual EGM's or venue areas may be available for rent at different prices based on usage and/or venue traffic. In some examples, games may be active only when users are present in the virtual venue, with the operator only paying a share of revenue while the games are active. Alternatively, or in addition, virtual games may be displayed in the virtual casino in idle mode, with time-based pricing only activating when a user decides to play a game.

In some embodiments, users may invest in the creation of new metaverse casinos or other venues as shareholders. Shareholder status may allow the user to guide the design and/or operation of the venue. Shares could then be resold based on their market value, which may be based on the popularity and/or revenue generated by the venue. Revenue and transaction fees may be generated through purchase of virtual land, purchase of the games to populate the venue, revenue generation by the games, and/or selling or renting out the games, venue, and/or the entire property.

In some embodiments, the virtual environment may be customized, such as automatically populating favorite or custom game sets upon entry into the virtual venue, customizing a floor and/or game placement design based on user preferences, adding elements from favorite games into the venue environment, customizing games based on a user's preferences and/or the virtual venue's theme. Room ambiance, temperature, game volumes, virtual performances, and other environmental elements can be customized based on user preferences.

Before describing these and other features in greater detail, reference is now made to FIG. 1, which illustrates a gaming system 10 including a plurality of gaming devices 100. The gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
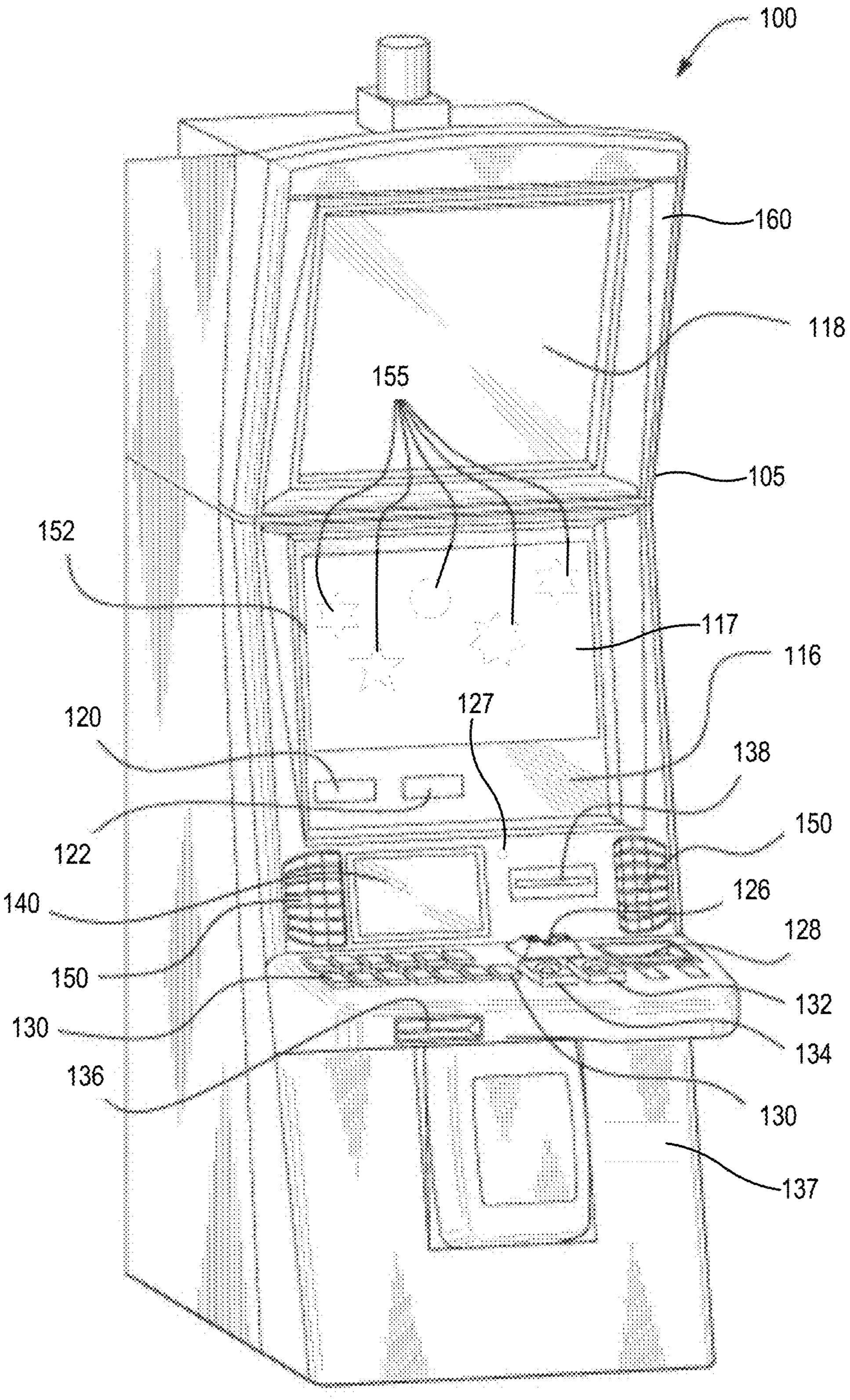
FIG. 2A is a perspective view of a gaming device that can be configured according to some embodiments.
Figure 2B:
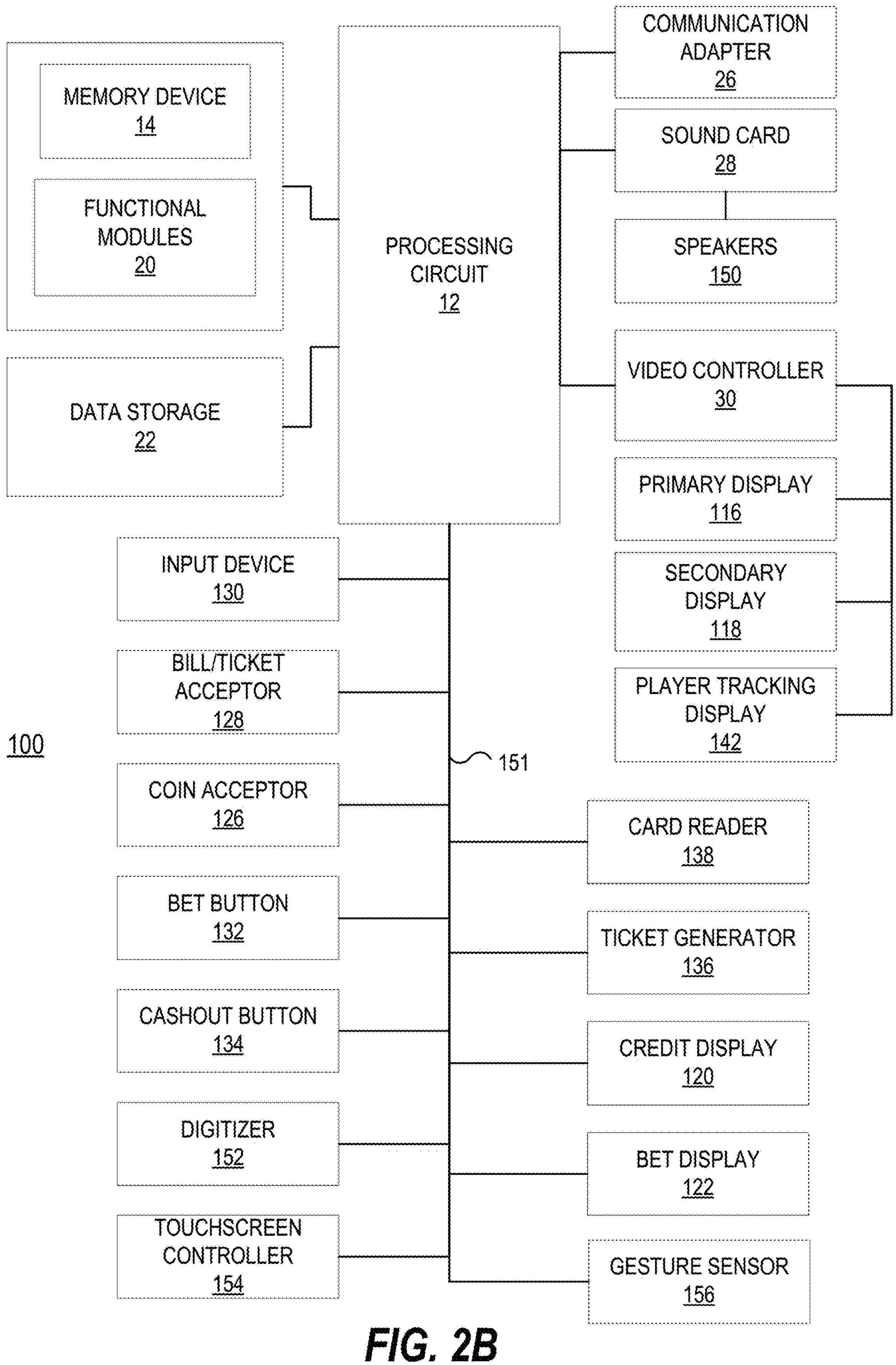
FIG. 2B is a schematic block diagram illustrating an electronic configuration for a gaming device according to some embodiments.
Figure 2C:
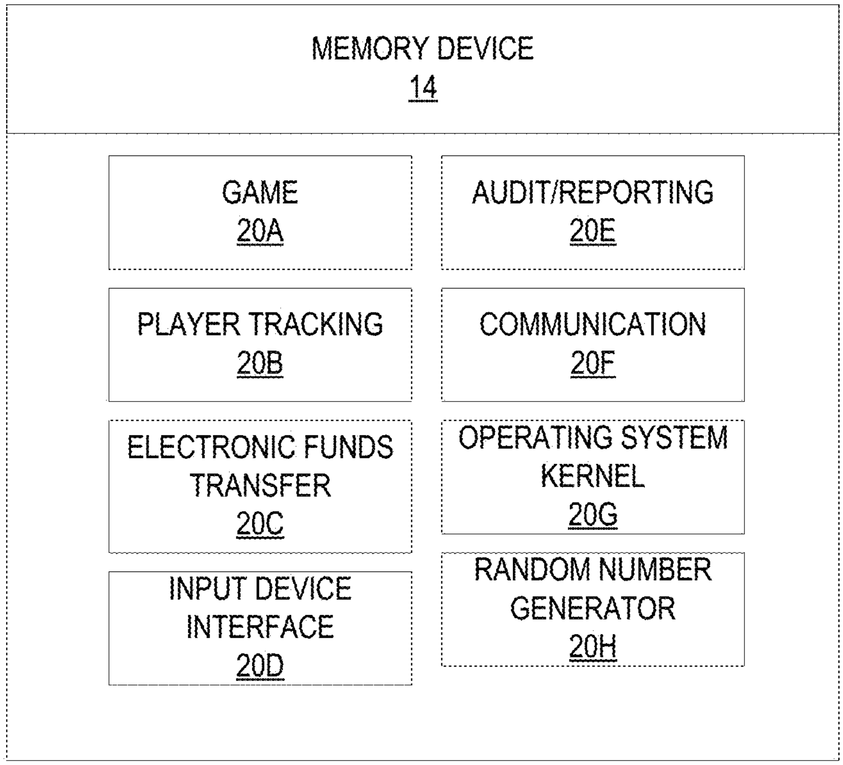
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
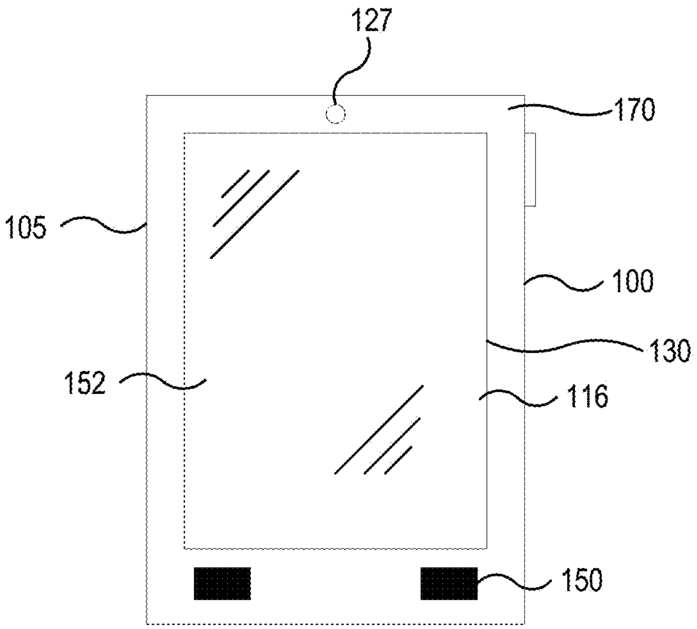
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
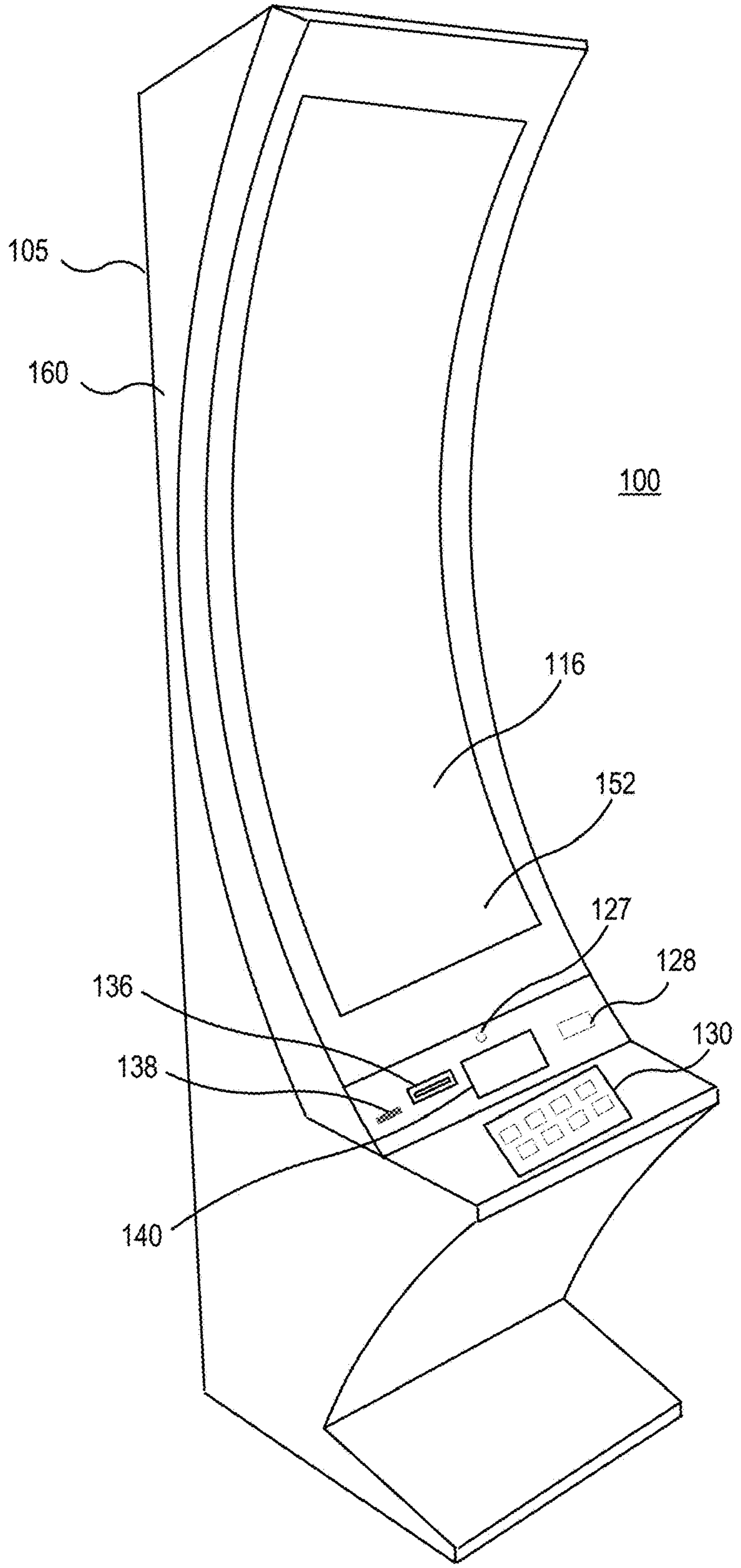
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 2F:
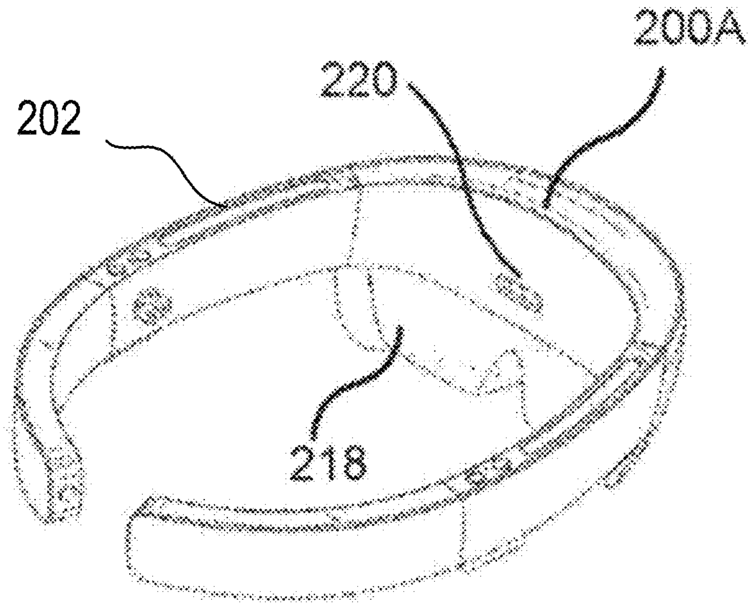
FIGS. 2F and 2G illustrate VR/AR devices according to various embodiments.

FIG. 2F illustrates a virtual reality (VR) viewer 200A implemented as a 3D headset including a pair of displays 218 on which images of virtual objects may be displayed. The viewer 200A includes a head-wearable frame 202, with the displays 218 coupled to the frame 202 to position the display device in a field of view of user wearing the viewer 200A. Different stereoscopic images may be displayed on the displays 218 to create an appearance of depth. The VR viewer 200A may include a plurality of sensors 220 that the device uses to determine a position, orientation, and/or movement of the viewer 200A, which may be used to determine a position, orientation, and/or direction of movement within an SVE.

The viewer 200A may further include other sensors, such as a gyroscopic sensor, a GPS sensor, one or more accelerometers, and/or other sensors that allow the viewer 200A to determine its position and orientation in space. In some embodiments, the viewer 200A may include one or more cameras that allow the viewer 200A to determine its position and/or orientation in space using visual simultaneous localization and mapping (VSLAM). viewer 200A may further include one or more microphones and/or speakers that allow the user to interact audially with the device.

In some embodiments, a viewer may also include semi-transparent lenses that allow the user to see both the real world as well as the 3D image rendered on the lenses, e.g., to provide an augmented reality (AR) experience. The viewer may also include additional cameras or other sensors to obtain a live video signal for building a 3D model of the space around the user. The viewer may also generate a 3D image of an object to display to the user that takes into account the real-world objects around the user and allows the user to interact with the 3D object.

Figure 2G:
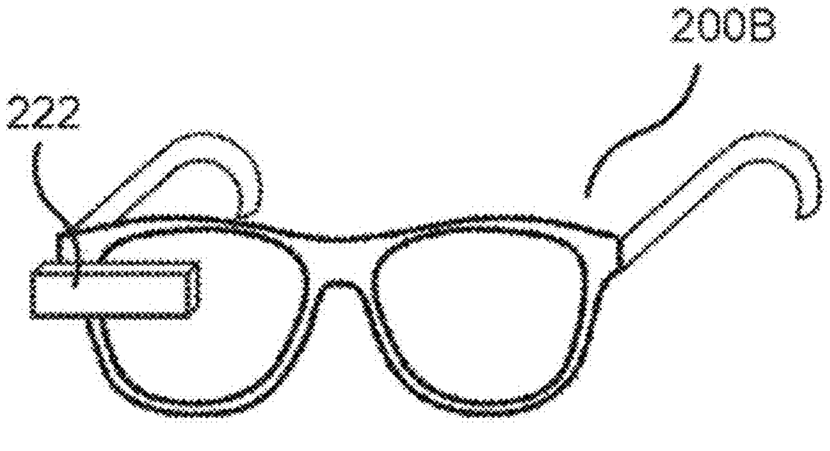

Referring to FIG. 2G, an augmented reality (AR) viewer 200B may be implemented as a pair of glasses including a transparent prismatic display 222 that displays an image to a single eye of the user. Such a device may be capable of displaying images to the user while allowing the user to see the world around the user, and as such can be used as an AR device.

In other embodiments, a VR and/or AR viewer may be implemented using a virtual retinal display device that raster scans an image directly onto the retina of the user. In still further embodiments, a VR and/or AR viewer may be implemented using a mobile wireless device, such as the mobile gaming device 170 of FIG. 2D above, a mobile telephone, a tablet computing device, and/or a personal digital assistant, etc.

Although illustrated as certain gaming devices, such as electronic gaming machines (EGMs), mobile gaming devices, VR/AR headsets, etc., functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
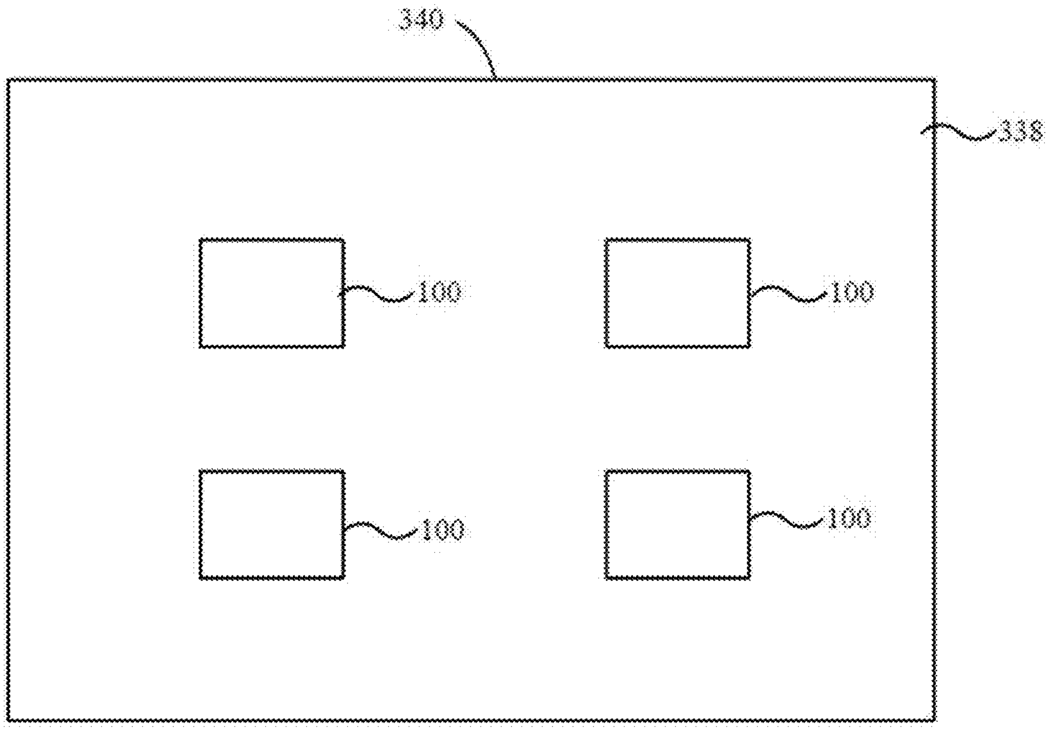
FIG. 3A is a map of a gaming area, such as a casino floor, according to some embodiments.

FIG. 3A illustrates, in plan view, an example map 338 of a gaming area 340. The gaming area 340 may, for example, be a casino floor. The map 338 shows the location of a plurality of gaming devices 100 (e.g., EGMs) within the gaming area 340. As will be appreciated, the locations of the gaming devices 100 within a gaming area 340 are generally fixed, although EGMs may be relocated from time to time, such as when new EGMs are introduced, to create new traffic flow patterns within the gaming area 340, to feature or highlight certain games, etc. As noted above, in order to assist the operation of the VR devices 200, the VR/AR controller 114 may store a three-dimensional wireframe map of the gaming area 340, and may provide the three-dimensional wireframe map to the VR viewers 200.

Figure 3B:
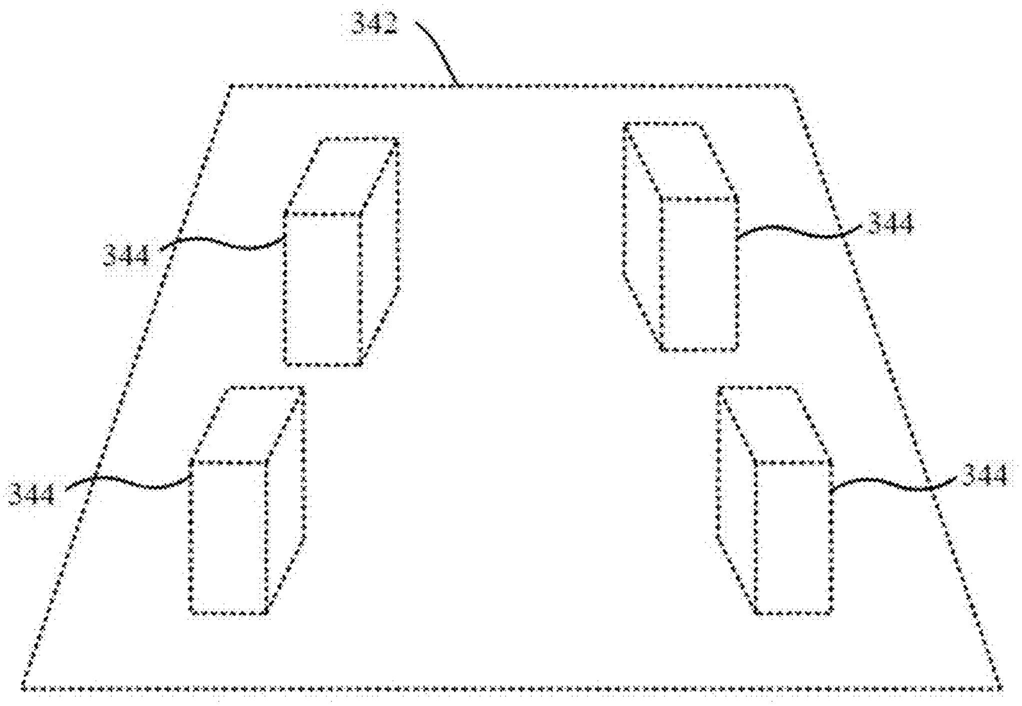
FIG. 3B is a 3D wireframe model of the gaming area of FIG. 3A, according to some embodiments.

An example of a wireframe map 342 for an SVE is shown in FIG. 3B. The wireframe map 342 is a three-dimensional model of the gaming area 340. As shown in FIG. 3B, the wireframe map 342 includes wireframe models 344 that may correspond to the gaming devices 100 that are physically in the gaming area 340. The wireframe models 344 may also be entirely or partially virtual, e.g., existing only in the wireframe model 344 for the SVE. The wireframe models 344 may be pregenerated to correspond to various EGM form factors, such as single display EGMs, mechanical slot EGMs, dual display EGMs, etc. The pregenerated models may then be placed into the wireframe map 342, for example, by a designer or other personnel. The wireframe map 342 may be updated at any time. For example, in an example where the wireframe map 342 corresponds to a real-world gaming area 340, the wireframe map 342 may be updated whenever the physical location of EGMs in the gaming area 340 is changed.

In some embodiments, the wireframe map 342 may be generated automatically using a VR/AR device 200, such as a 3D headset, that is configured to perform a three-dimensional depth scan of its surroundings and generate a three-dimensional model based on the scan results. Thus, for example, an operator using a VR/AR device 200 may perform a walkthrough of the gaming area 340 while the VR/AR device 200 builds the 3D map of the gaming area.

The three-dimensional wireframe map 342 may enable a VR/AR device 200 to more quickly and accurately determine its position and/or orientation within the gaming area. For example, a VR/AR device 200 may determine its location within the gaming area 340 using one or more position/orientation sensors. The VR/AR device 200 then builds a three-dimensional map of its surroundings using depth scanning, and compares its sensed location relative to objects within the generated three-dimensional map with an expected location based on the location of corresponding objects within the wireframe map 342. The VR/AR device 200 may calibrate or refine its position/orientation determination by comparing the sensed position of objects with the expected position of objects based on the wireframe map 342. Moreover, in an AR implementation, the VR/AR device 200 can be aware of objects or destinations within the gaming area 340 that it has not itself scanned, because the VR/AR device 200 has access to the wireframe map 342 of the entire gaming area 340. Processing requirements on the VR/AR device 200 may also be reduced because the wireframe map 342 is already available to the VR/AR device 200.

In some embodiments, the wireframe map 342 may store various information about EGMs in the gaming area, such as the identity, type, orientation and location of various types of EGMs, the locations of exits, bathrooms, courtesy desks, cashiers, ATMs, ticket redemption machines, etc. Such information may be used by a VR/AR device 200 to help the user navigate the gaming area. For example, if a user desires to find a destination within the gaming area, the user may ask the VR/AR device 200 for directions using a built-in microphone and voice recognition function in the VR/AR device 200 or use other hand gestures or eye/gaze controls tracked by the VR/AR device 200 (instead of or in addition to voice control). The VR/AR device 200 may process the request to identify the destination, and then may display a virtual object, such as a virtual path on the ground, virtual arrow, virtual sign, etc., to help the user to find the destination. In some embodiments, for example, the VR/AR device 200 may display a halo or glow around the destination to highlight it for the user, or have virtual 3D sounds coming from it so players could more easily find the machine.

According to some embodiments, a user of a VR/AR device 200 may use the VR/AR device 200 to obtain information about players and/or EGMs on a casino gaming floor. The information may be displayed to the user on the VR/AR device 200 in a number of different ways such as by displaying images on the VR/AR device 200 that appear to be three dimensional or two-dimensional elements of the scene as viewed through the VR/AR device 200. In general, the type and/or amount of data that is displayed to the user may depend on what type of user is using the VR/AR device 200 and, correspondingly, what level of permissions or access the user has. For example, a VR/AR device 200 may be operated in one of a number of modes, such as a player mode, an observer mode or an operator mode. In a player mode, the VR/AR device 200 may be used to display information about particular EGMs on a casino floor. The information may be generic information about an EGM or may be customized information about the EGM based on the identity or preferences of the user of the VR/AR device 200. In an observer mode, the VR/AR device 200 may be used to display information about particular EGMs on a casino floor or information about players of EGMs on the casino floor. In an operator mode, the VR/AR device 200 may also be used to display information about particular EGMs on a casino floor or information about players of EGMs on the casino floor, but the information may be different or more extensive than the information displayed to an observer.

Figure 4A:
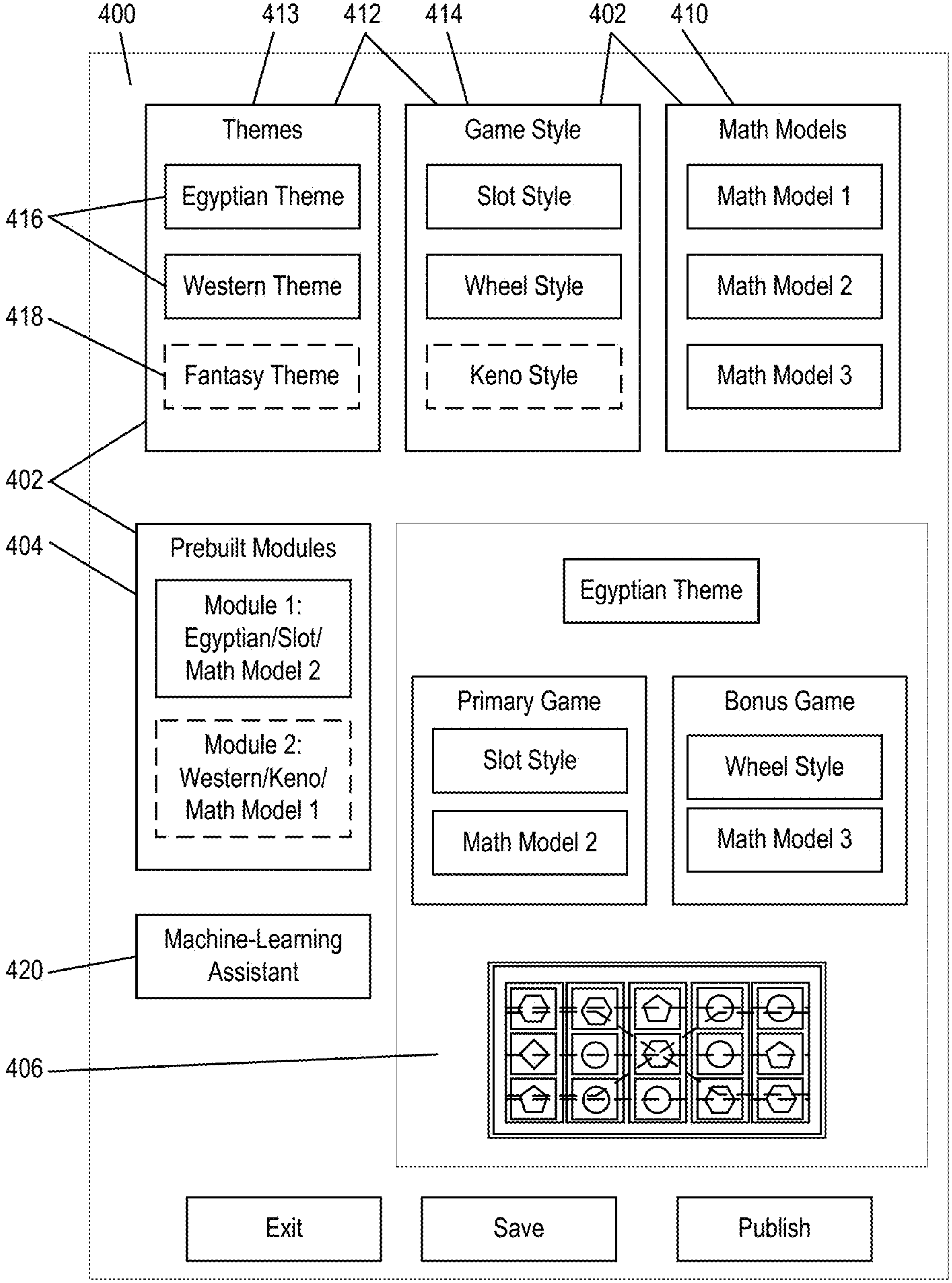
FIGS. 4A and 4B illustrate a graphical user interface (GUI) for creating and providing a virtual wagering game for use in a virtual gaming environment is illustrated, according to some embodiments.
Figure 4B:
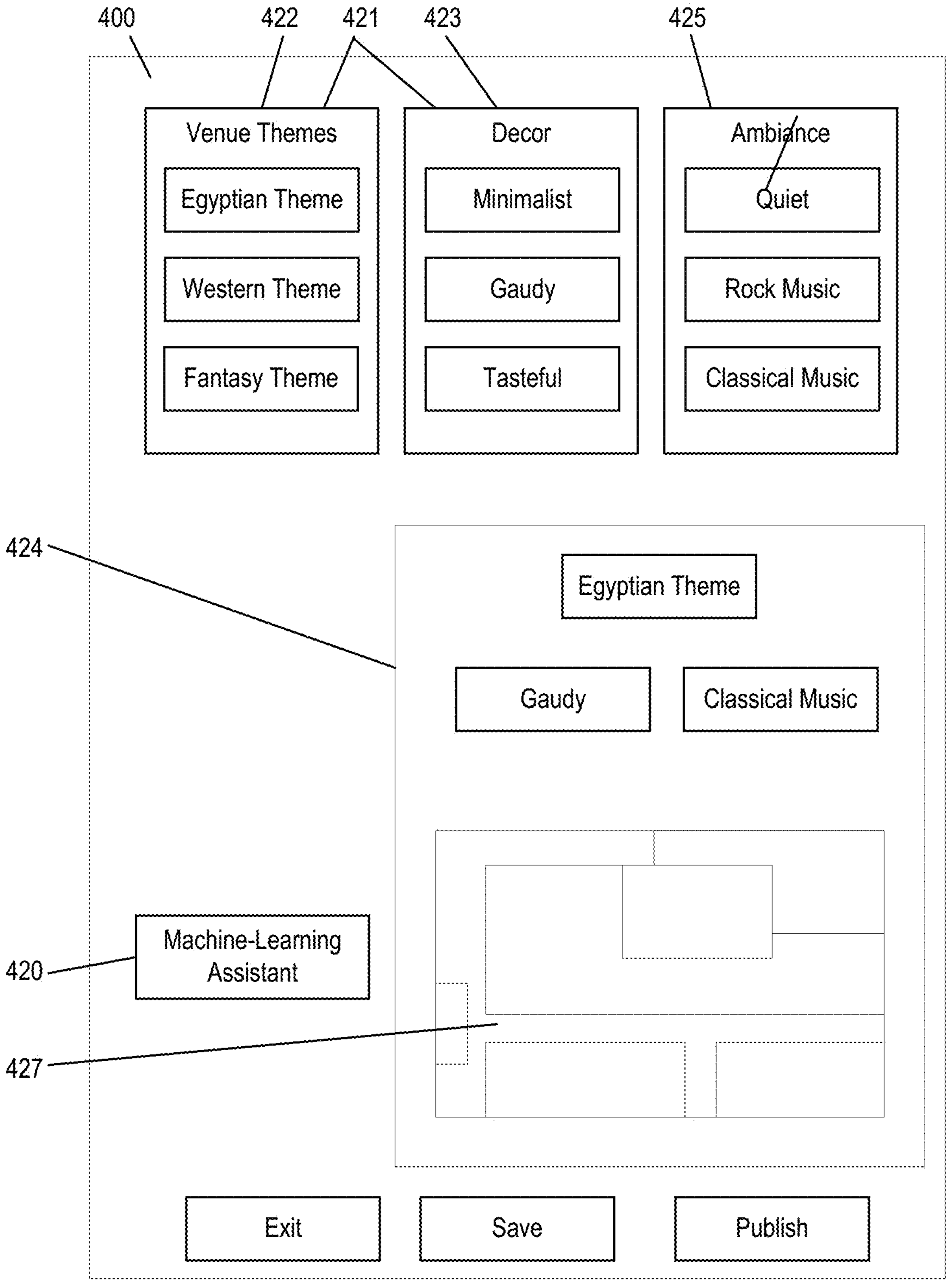

Referring now to FIGS. 4A and 4B, a graphical user interface (GUI) 400 for creating and providing a virtual wagering game for use in a virtual gaming environment is illustrated, according to some embodiments. As shown by FIG. 4A, the GUI 400 may include a plurality of wagering game assets 402, which may include a plurality of game modules 404 that may be selectively combined into a virtual wagering game 406 based on user input.

Each game module 404 may include a plurality of independent game features 408 for generating the virtual wagering game 406. Alternatively, or in addition, the assets 402 may include individual game features 408 that may be individually selected. The independent game features 408 may include different math models 410 for use in the game 406, different cosmetic game features 412, such as game themes 413, game styles 414, graphics, sounds, animations, etc., for use in the game 406, and/or other features.

In this embodiment, in response to payment of a license fee by the user (or another user input, as desired), a subset 416 of the game assets 402 may be unlocked for use by the user, with a remaining subset 418 remaining locked. The unlocking of the subset 416 may be valid for a predetermined time period in some examples.

In some examples, generation of a portion of the virtual wagering game 406 may be selectively performed by execution of a machine-learning model, e.g., in response to a machine-learning assist function 420 in the GUI 400 for example. In some examples, the machine-learning model or other function may determine a plurality of user preferences of the user and use the user preferences as inputs or prompts for generation of some or all of the virtual wagering game 406.

As shown by FIG. 4B, the GUI 400 may further include a plurality of virtual gaming environment assets 421, such as a venue theme 422, decor 423, lighting, sound, and/or ambiance effects 425, floorplan 427, etc., for a virtual gaming environment. In this example, the user may generate a customized virtual gaming environment 424 in a manner similar to the generation of the virtual wagering game 406, as desired. In some embodiments, the license fee may include access to some or all the virtual gaming environment assets 421 may be accessed independently, e.g., based on a separate license fee and/or based on some other criteria.

Figure 5:
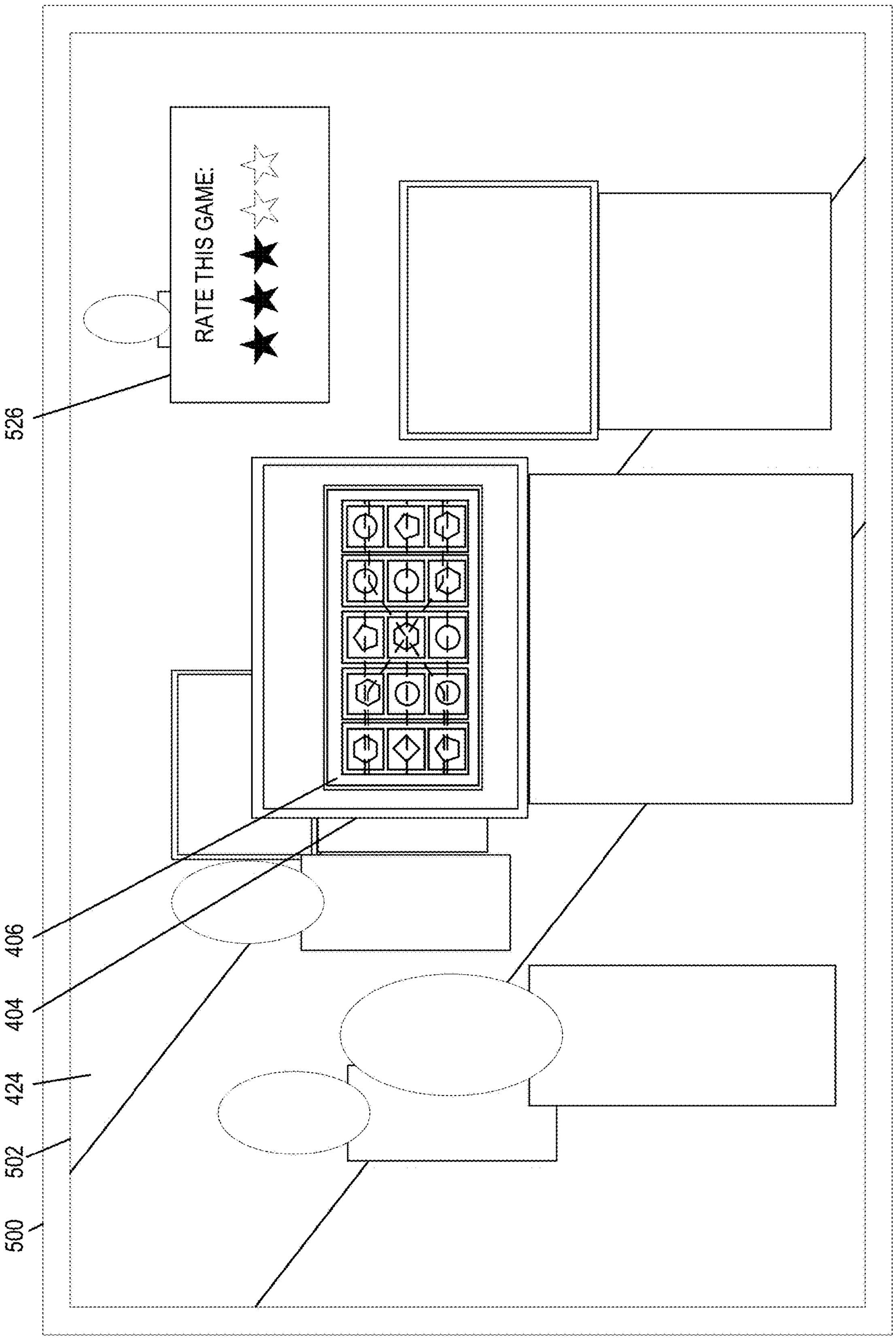
FIG. 5 illustrates a GUI of an SVE for a virtual casino environment, according to some embodiments.

Referring now to FIG. 5, a GUI 500 of an SVE 502 for a virtual casino environment 504 is illustrated. In this example, the virtual gaming environment 424 generated by the user in FIGS. 4A and 4B may be provided to other users in the SVE 502. The virtual gaming environment 424 may include wagering games, including the virtual wagering game 406 generated by the user in FIGS. 4A and 4B. Alternatively, or in addition, the virtual wagering game 406 may be provided in the SVE 502 independently of the virtual gaming environment 424, and/or in a different virtual gaming environment, as desired. In this manner, the virtual wagering game 406 may be provided to a plurality of players in the virtual gaming environment 424. Based on wagering by the players in the first wagering game 406, a revenue amount may be received, with a portion of the revenue being awarded to the user that created the virtual wagering game 406 and another portion being awarded to the operator, manufacturer, and/or other parties involved in provision and distribution of the virtual wagering game 406.

In some examples, the user that created the virtual gaming environment 424 may also or alternatively be awarded a portion of a total revenue received from activity in the virtual gaming environment 424, e.g., as a virtual owner or shareholder in the virtual gaming environment 424. In some examples, the total revenue may include revenue from other virtual wagering games, from admission fees charged to the players for entry into the virtual gaming environment 424, and/or other sources. In some examples, eligibility for receiving a portion of revenue may be based on payment of a license fee by the user. In some examples, eligibility for receiving a portion of revenue may be time-limited, i.e., awarded for a predetermined time period.

In this example, the players of the virtual wagering game 406 may have the option to provide a game rating 526 for the virtual wagering game, with another portion of the revenue for the virtual wagering game 406 being awarded to the user based on game ratings 536 meeting a predetermined threshold, such as a minimum average game rating, a minimum number of game ratings, etc.

Figure 6:
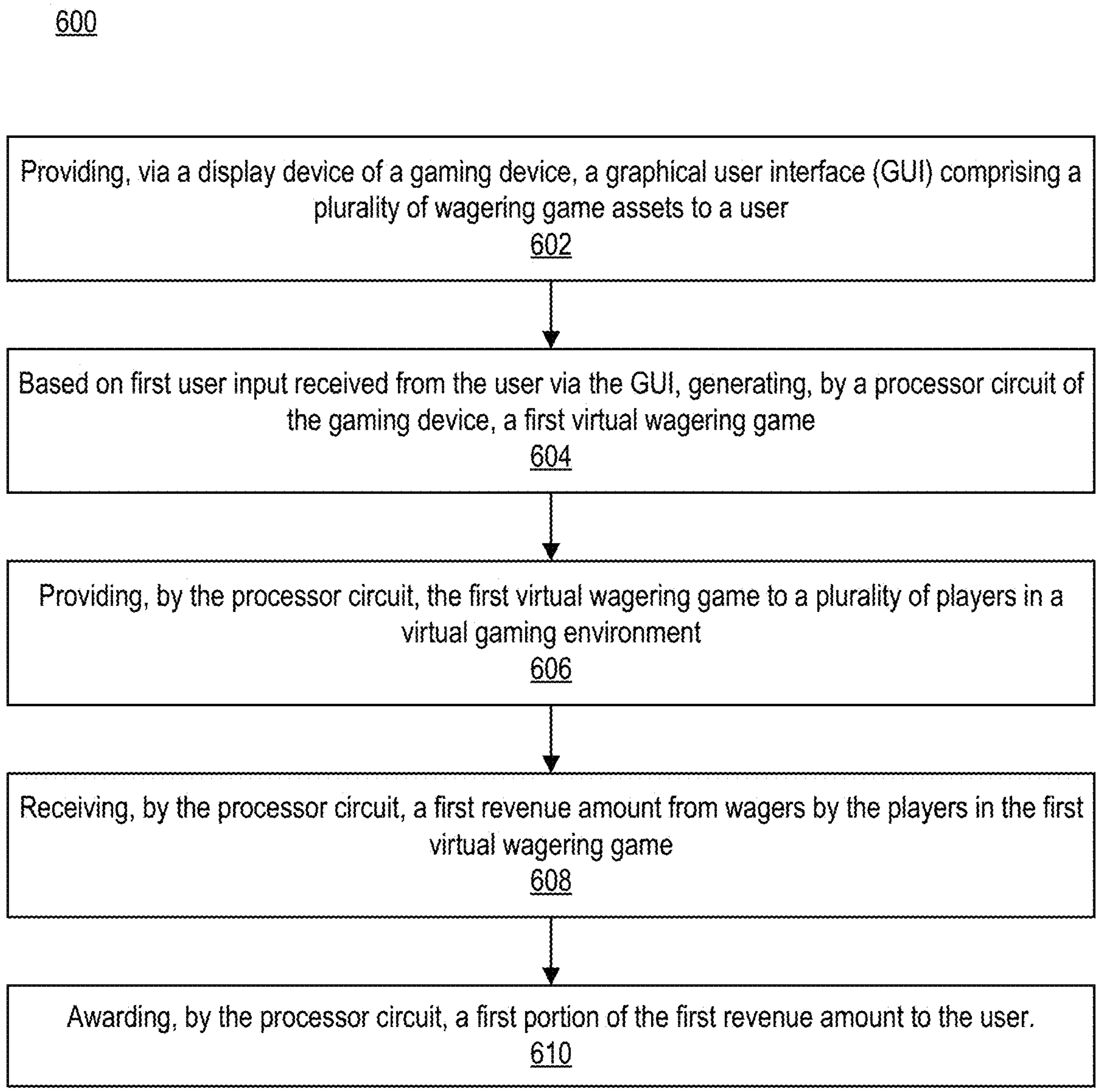
FIG. 6 is a flowchart illustrating operations of systems/methods of generating and providing a virtual wagering game is illustrated, according to some embodiments.

Referring now to FIG. 6, a flowchart illustrating operations 600 of systems/methods of generating and providing a virtual wagering game is illustrated, according to some embodiments. The operations 600 may include providing, via a display device of a gaming device, a graphical user interface (GUI) comprising a plurality of wagering game assets to a user (Block 602). The operations 600 may further include, based on first user input received from the user via the GUI, generating, by a processor circuit of the gaming device, a first virtual wagering game (Block 604). The operations 600 may further include providing, by the processor circuit, the first virtual wagering game to a plurality of players in a virtual gaming environment (Block 606). The operations may further include receiving, by the processor circuit, a first revenue amount from wagers by the players in the first virtual wagering game (Block 608). The operations 600 may further include awarding, by the processor circuit, a first portion of the first revenue amount to the user (Block 610).

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a processor circuit; and a memory coupled to the processor circuit, the memory comprising machine-readable instructions that, when executed by the processor circuit, cause the processor circuit to:

provide a graphical user interface (GUI) comprising a plurality of wagering game assets to a user;

based on first user input received from the user via the GUI, generate a first virtual wagering game corresponding to a physical wagering game provided by an electronic gaming machine (EGM) in a physical gaming area comprising a plurality of EGMs;

transmit, to virtual reality (VR) devices of a plurality of players, a three-dimensional wireframe map of the physical gaming area, wherein the VR devices generate a virtual gaming environment based on the three-dimensional wireframe map;

provide, via the VR devices, the first virtual wagering game to the plurality of players in the virtual gaming environment;

receive a first revenue amount from wagers by the players in the first virtual wagering game;

award a first portion of the first revenue amount to the user;

receive a plurality of game ratings for the first virtual wagering game from the plurality of players in the virtual gaming environment; and award a second portion of the first revenue amount to the user based on the plurality of game ratings.

2. The system of claim 1, wherein the plurality of wagering game assets comprises a plurality of game modules comprising a plurality of independent game features for generating the first virtual wagering game.

3. The system of claim 1, wherein the instructions further cause the processor circuit to:

unlock a subset of the plurality of wagering game assets based on second user input received from the user via the GUI.

4. The system of claim 3, wherein the second user input comprises payment of a license fee by the user.

5. The system of claim 4, wherein unlocking the subset of the plurality of wagering game assets is valid for a predetermined time period.

6. The system of claim 3, wherein the subset of the plurality of wagering game assets comprises a math model for the first virtual wagering game.

7. The system of claim 3, wherein the subset of the plurality of wagering game assets comprises a cosmetic game feature for the first virtual wagering game.

8. The system of claim 1, wherein the instructions further cause the processor circuit to:

receive a second revenue amount from wagers by the players in a plurality of second wagering games in the virtual gaming environment; and award a portion of the second revenue amount to the user.

9. The system of claim 8, wherein the award of the first portion of the second revenue amount to the user is further based on payment of a license fee by the user.

10. The system of claim 9, wherein the first portion of the second revenue amount is awarded to the user for a predetermined time period.

11. The system of claim 8, wherein the instructions further cause the processor circuit to:

receive a third revenue amount from the players for admission to the virtual gaming environment; and award a portion of the third revenue amount to the user.

12. The system of claim 1, wherein the instructions further cause the processor circuit to execute a machine-learning model to generate a portion of the first virtual wagering game.

13. The system of claim 12, wherein the instructions further cause the processor circuit to:

determine a plurality of user preferences of the user;

input the plurality of determined user preferences into a machine-learning model; and wherein generation of the virtual wagering game is further based on an output of the machine-learning model.

14. The system of claim 1, wherein the GUI further comprises a plurality of virtual gaming environment assets, and wherein the virtual gaming environment is generated based on second user input received from the user via the GUI.

15. The system of claim 14, wherein the second user input comprises payment of a license fee by the user.

16. A gaming device comprising:

a display device;

an input device;

a processor circuit; and a memory coupled to the processor circuit, the memory comprising machine-readable instructions that, when executed by the processor circuit, cause the processor circuit to:

display a graphical user interface (GUI) via the display device comprising a plurality of wagering game assets to a user;

based on first user input received from the user via the GUI, generate a first virtual wagering game corresponding to a physical wagering game provided by an electronic gaming machine (EGM) in a physical gaming area comprising a plurality of EGMs;

transmit, to virtual reality (VR) devices of a plurality of players, a three-dimensional wireframe map of the physical gaming area, wherein the VR devices generate a virtual gaming environment based on the three-dimensional wireframe map;

provide, via the VR devices, the first virtual wagering game to the plurality of players in the virtual gaming environment;

receive a first revenue amount from wagers by the players in the first virtual wagering game;

award a first portion of the first revenue amount to the user receive a plurality of game ratings for the first virtual wagering game from the plurality of players in the virtual gaming environment; and award a second portion of the first revenue amount to the user based on the plurality of game ratings.

17. The gaming device of claim 16, wherein the plurality of wagering game assets comprises a plurality of game modules comprising a plurality of independent game features for generating the first virtual wagering game.

18. A method comprising:

providing, via a display device of a gaming device, a graphical user interface (GUI) comprising a plurality of wagering game assets to a user;

based on first user input received from the user via the GUI, generating, by a processor circuit of the gaming device, a first virtual wagering game corresponding to a physical wagering game provided by an electronic gaming machine (EGM) in a physical gaming area comprising a plurality of EGMs;

transmitting by the processor circuit to virtual reality (VR) devices of a plurality of players, a three-dimensional wireframe map of the physical gaming area, wherein the VR devices generate a virtual gaming environment based on the three-dimensional wireframe map;

providing, by the processor circuit via the VR devices, the first virtual wagering game to the plurality of players in the virtual gaming environment;

receiving, by the processor circuit, a first revenue amount from wagers by the players in the first virtual wagering game;

awarding, by the processor circuit, a first portion of the first revenue amount to the user receiving a plurality of game ratings for the first virtual wagering game from the plurality of players in the virtual gaming environment; and awarding a second portion of the first revenue amount to the user based on the plurality of game ratings.

19. The method of claim 18, wherein the plurality of wagering game assets comprises a plurality of game modules comprising a plurality of independent game features for generating the first virtual wagering game.

20. The method of claim 18, further comprising unlocking a subset of the plurality of wagering game assets based on second user input received from the user via the GUI.

* * * * *